United States Patent [19]
Hagguist et al.

[11] Patent Number: 5,230,473
[45] Date of Patent: Jul. 27, 1993

[54] CARPET RECLAIMER

[76] Inventors: James A. E. Hagguist, 2120 Berkeley Ave., St. Paul, Minn. 55105; Robert M. Hume, 7171 Ivystone Ave., Cottage Grove, Minn. 55016

[21] Appl. No.: 867,497

[22] Filed: Apr. 13, 1992

[51] Int. Cl.$^5$ .................... B02C 19/12; B02C 23/14
[52] U.S. Cl. ........................... 241/3; 241/24; 241/101.4; 241/DIG. 38; 156/94
[58] Field of Search ............ 241/3, 24, 79, 81, 101.4, 241/DIG. 38; 156/94, 344, 584; 209/2

[56] References Cited

U.S. PATENT DOCUMENTS

| | | | |
|---|---|---|---|
| 3,725,538 | 4/1973 | Brewer | 241/DIG. 38 X |
| 4,662,569 | 5/1987 | Acker | 241/DIG. 38 X |
| 4,824,498 | 4/1989 | Goodwin et al. | 156/344 X |

Primary Examiner—Mark Rosenbaum
Assistant Examiner—Frances Chin
Attorney, Agent, or Firm—Haugen and Nikolai

[57] ABSTRACT

A means for reclaiming standard carpet by disintegrating and separating carpet into its base component materials, through a process and apparatus that, through a series of mechanical, hydraulic, fluid, heat and pressure devices, separates and segregates carpet into its principal components, i.e., secondary backing, binder, pile and primary backing.

38 Claims, 12 Drawing Sheets

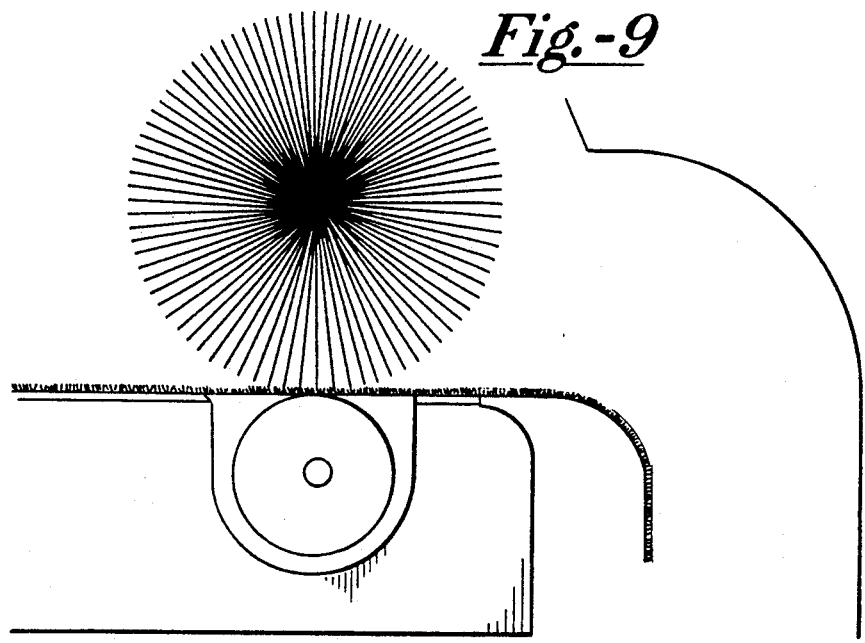
*Fig.-9*
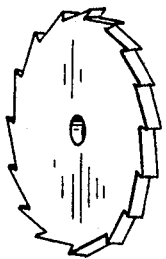  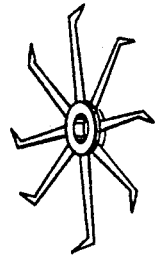
*Fig.-10A*   *Fig.-10B*
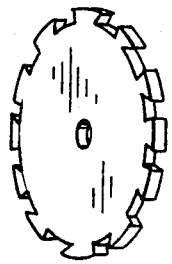  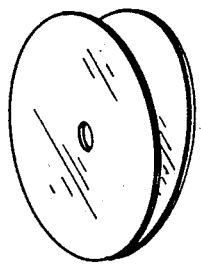  
*Fig.-10C*   *Fig.-10D*   *Fig.-10E*

CARPET RECLAIMER

BACKGROUND

1. Field of Invention

This invention relates to reclamation of the base component materials of carpet, through a machine process that disintegrates, separates and segregates carpet into it base component materials.

2. Description of Prior Art

Over 800 million square yards of carpet are manufactured in the United States each year, a large and increasing percentage of which is installed to replace carpet in commercial buildings and homes. A tremendous amount of the carpet being replaced is discarded in landfills, adding to our waste disposal problem, and further burdening our environment.

At present, a small portion of removed carpet is being reclaimed, primarily by one of two means: (1) hot-wire skimming the nylon pile from the surface of carpet; and (2) mechanically grinding carpet into a heterogeneous mixture of secondary and primary backing, latex binder and pile, which produces an amalgam of limited utility.

After diligent search (see enclosed Information Disclosure Form) no prior art has been discovered, not is any reference made, to any process or apparatus designed to effect the debonding and separation of carpet into its base component materials.

The "Carpet Reclaimer" meets this need, through a process and apparatus that breaks down the bonding elements in carpet, and separates and segregates carpet into its base component materials, each of which is a reusable resource.

BRIEF DESCRIPTION OF THE INVENTION

We have developed a method and machine that continuously and completely debonds and separates standard carpet into its base component materials—primary backing, secondary backing, binder and pile.

Presorted carpet is first placed on an entry alignment table, where it is justified to one side of the machine. The carpet next passes one of several retractable rejection ports, where it is electronically and visually inspected for flaws and contaminants (metal, burns, etc.). The carpet then moves into the debonding section of the machine, where it is subjected to fluids (air, water, steam, chemicals) under variable temperature, pressure and direction controls, to plasticize the latex binder and debond the secondary backing from the carpet matrix.

After passing another rejection port, the carpet enters a machine section where a series of rotating elements (e.g., brushes or pin wheels), with or without air or water jets to assist, strip the secondary backing from the underside of the carpet matrix and divert the secondary backing into a separate collection device.

The remaining carpet matrix (now consisting of the pile, primary backing and the latex binder) is again subjected to pressurized fluids (air, water, steam, chemicals) under temperature and directional controls, which, in conjunction with mechanical and/or hydraulic impingement devices (with variable speed and rotation), remove most of the latex binder from the pile/primary backing matrix.

The remaining carpet matrix (now consisting of the pile and primary backing) then proceeds into the fourth section of the machine, where the carpet matrix is acted upon by rotating elements (e.g., brushes, pin wheels) that remove the pile from the underside (preferentially) of the primary backing. The pile is then directed to a separate collection device.

In the final step, the primary backing is collected and diverted to its collection device.

BRIEF DESCRIPTION OF THE DRAWINGS

In the drawings, closely related figures have the same number, but different alphabetic suffixes.

FIG. 9 illustrates the primary backing transfer station that moves the primary backing to a collection container.

FIGS. 10A through 10E illustrate examples of top loop cutters, illustrated in FIGS. 3A through 3D.

FIG. 12A shows horizontal circular scrubbing with chemicals, and FIG. 12B shows high pressure circulating steam/water/spray with chemicals.

FIGS. 13A through 13E illustrate various mechanical elements used in the removal of the pile, as shown in FIGS. 8A through 8E.

DETAILED DESCRIPTION OF THE PREFERRED EMBODIMENT

Figure 1:
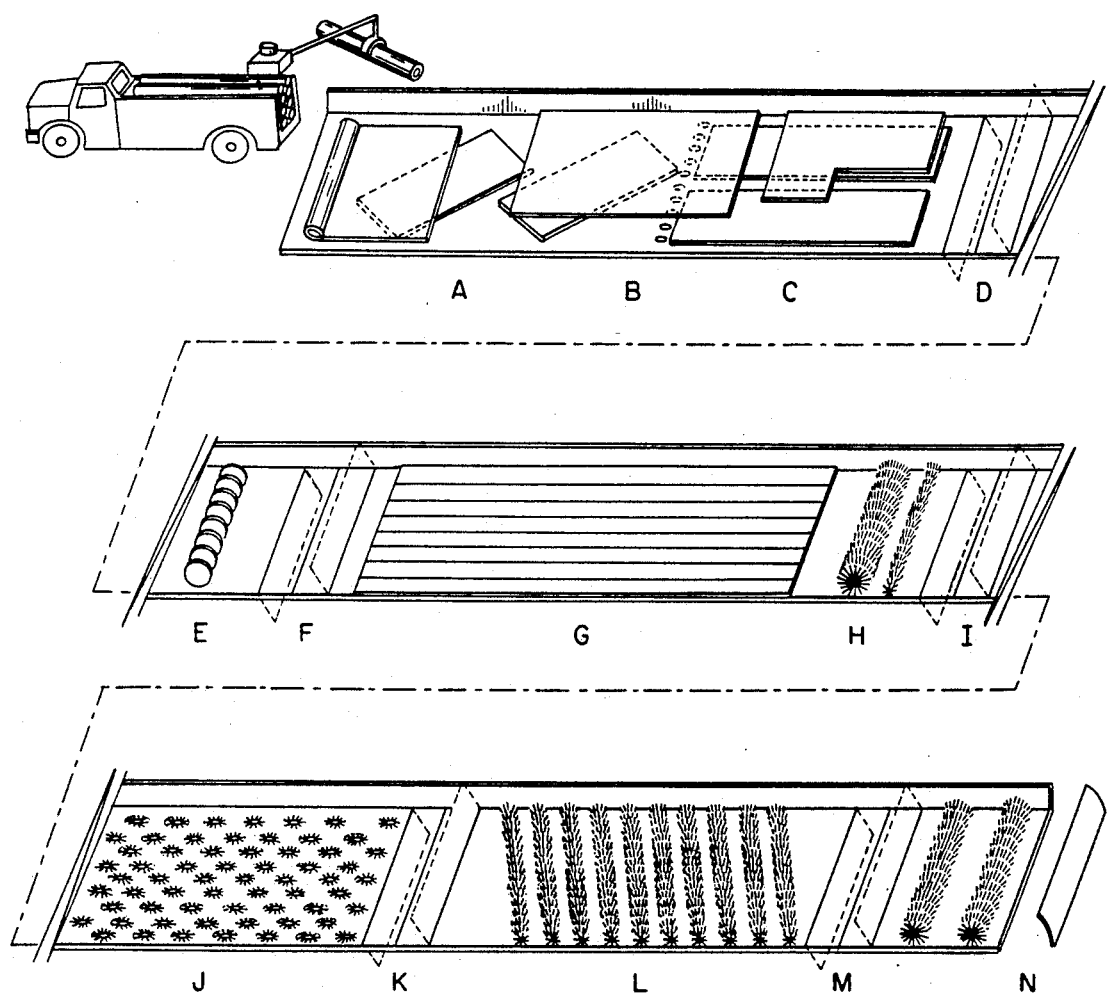
FIGS. 1A through 1N illustrate the various stages of the apparatus and process for the debonding and separation of carpet into its separate components.
Figure 14:
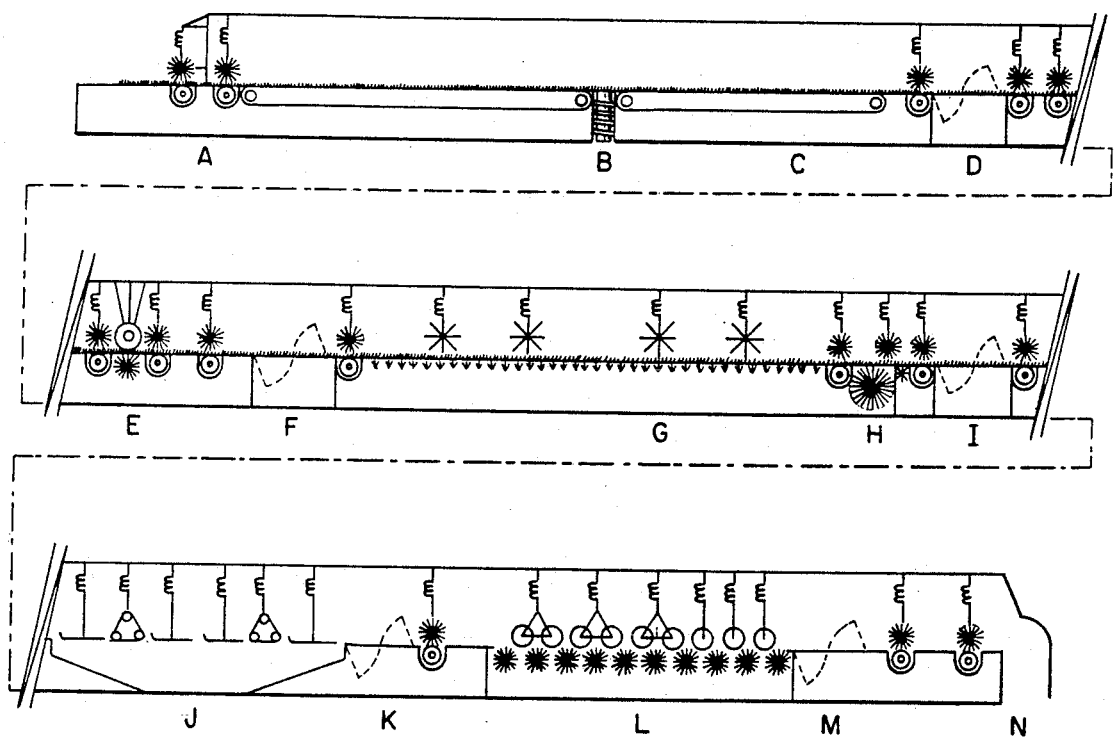
FIGS. 14A through 14N illustrate cross section schematic configuration of the apparatus and process cited in FIGS. 1A through 1N.

Referring to the two overviews of the apparatus [FIGS. 1, 14], an embodiment of the invention is shown for disintegrating, separating and segregating carpet into its base component materials.

In this embodiment, presorted carpet is placed on a moving entry table, where it is justified to one side of the machine [FIGS. 1A, 14A]. Justification is accomplished by rotating elements, positioned to advance the carpet in a diagonal direction, moving one edge of the carpet to one side of the entry table. Justification occurs such that the carpet's dominant dimension is moving in the machine direction via a propulsion device [FIG. 11A-E].

Inspection/Rejection Stations

The carpet next passes an inspection point [FIGS. 1B, 14B], which includes electromagnetic inspection for metal contaminants. If a metal contaminate is detected, an alarm could be activated. The carpet next passes a visual inspection station [FIGS. 1C, 14C], and if carpet warrants rejection due to presence of metal, or other contaminants, it may be diverted via a retractable rejection port [FIGS. 1D, 14D].

Figure 2:
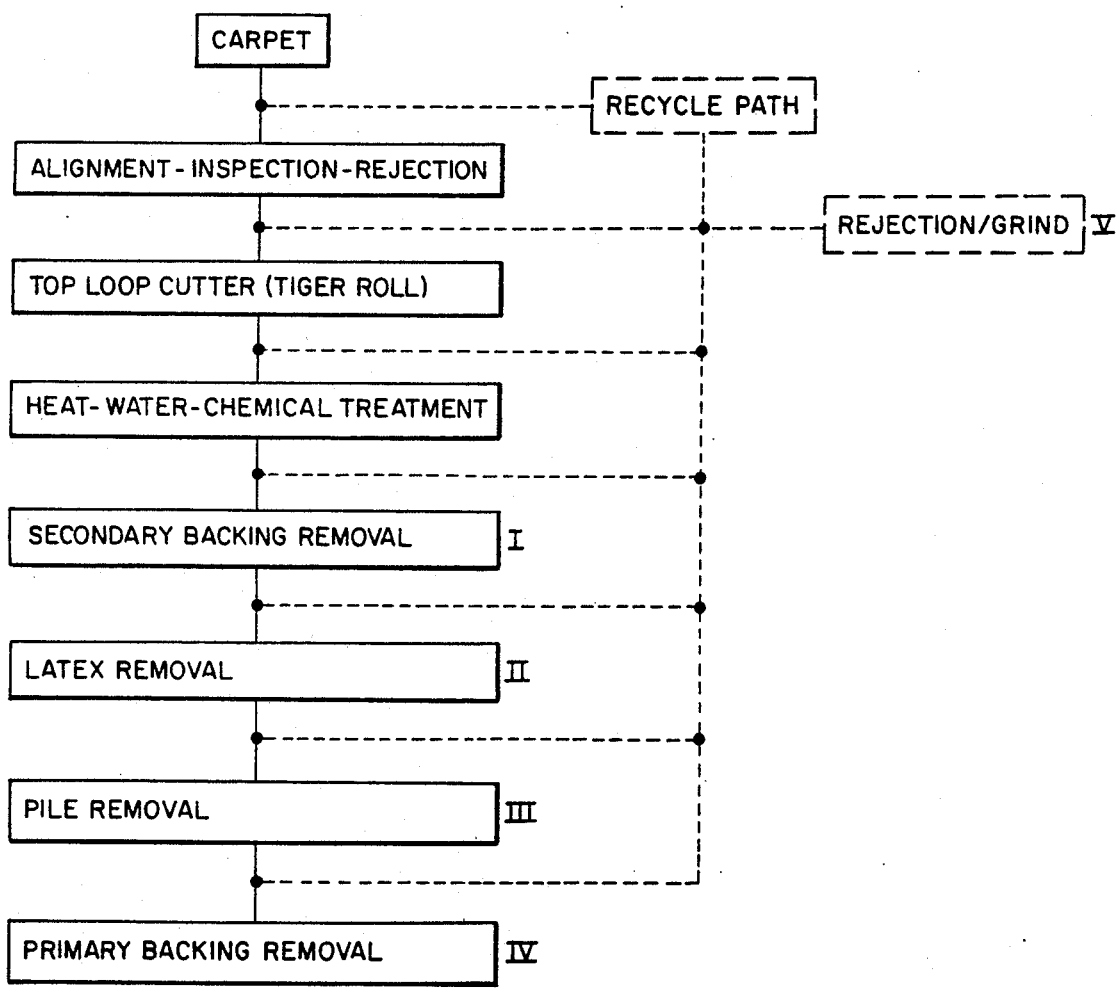
FIG. 2 illustrates the flow diagram for the apparatus and the method for debonding and separating the carpet into its component materials, also showing the rejection ports or recycle paths.

Rejection ports may be present between each process of disintegration, separation and segregation of carpet [FIGS. 1D, 1F, 1I, 1K, 1M, 14D, 14F, 14I, 14K, 14M], to divert carpet that contains contaminants, or presence of other undesirable characteristics. Rejection ports are further shown in the schematic drawing [FIG. 2] as a recycle path or rejection path, wherein, at any time during the processing of the carpet, it is determined that for some reason (e.g., dirt, burned, fused, melted or otherwise damaged areas) the carpet is not processing correctly through a given section, the diverting port allows for the uninterrupted operation of the machine as sections of carpet are quickly diverted through a reject port.

Top Loop Cutter

Figures 3A, 3B:
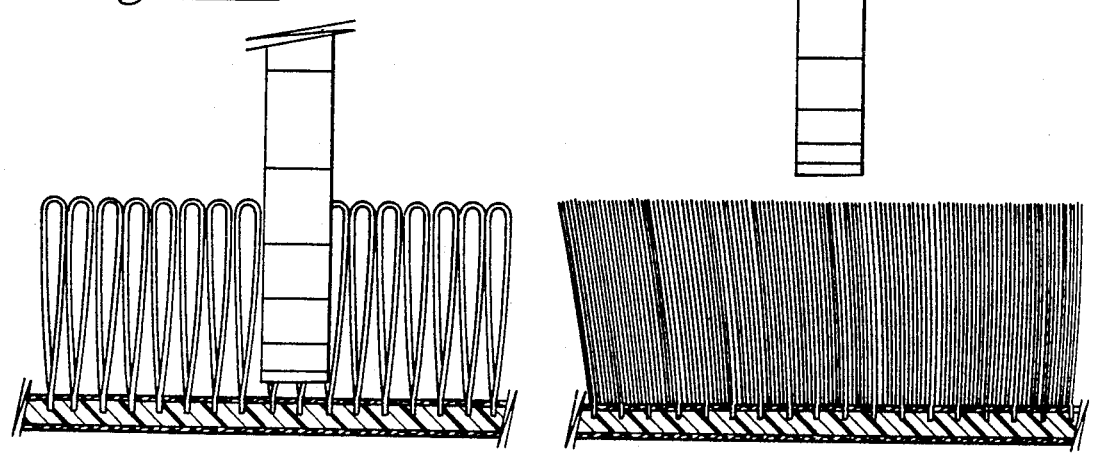
FIGS. 3A through 3D illustrate the mechanism cited in FIGS. 1E and 14E, wherein the top loop, if present in the carpet, is cut by a rotating blade. (Types of rotating blades are illustrated in FIGS. 10A through 14E).
Figures 3C, 3D:
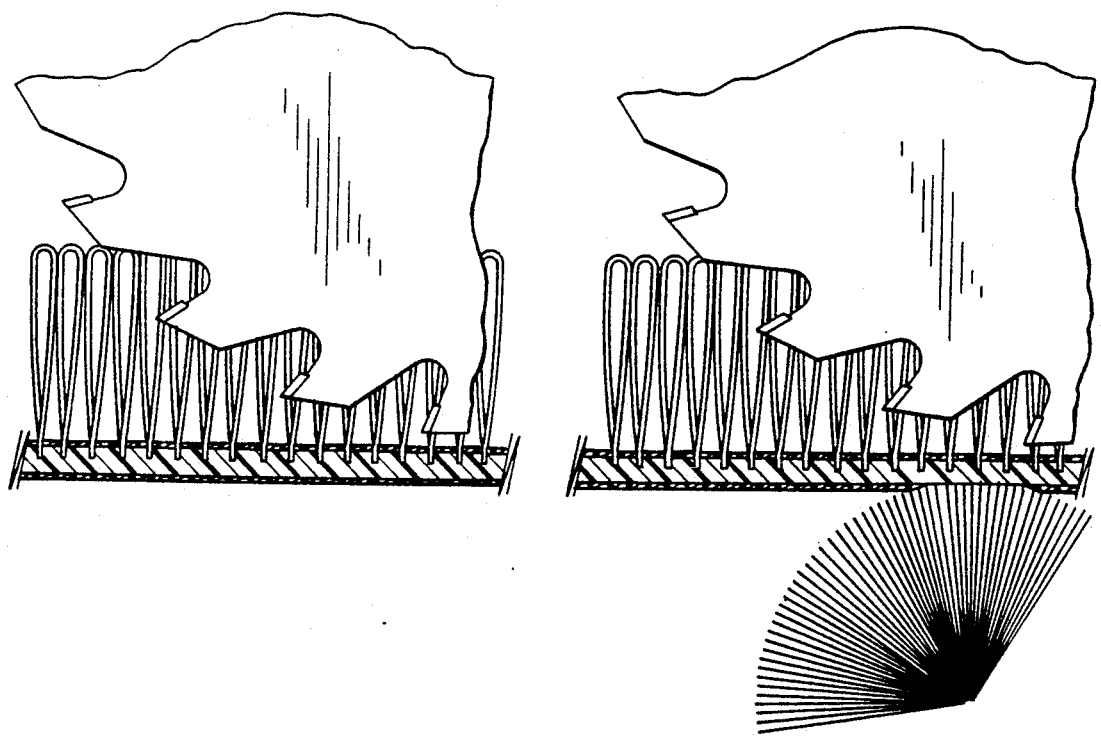

After passing the first inspection and rejection stations [FIGS. 1C-1D, 14C-14D], the carpet then moves to a station having a means for segmenting continuous yarn carpet, with rotating cutting edges positioned to shear the loops of continuous yarn carpet, commonly applying a top loop cutter or variation thereof, wherein looped carpet, if present, is subjected to mechanical shearing [FIGS. 3A, 3C, 3D] or a system of rotating blades, discs, or cutting edges [FIGS. 10A-10E]. This cutting action reduces the looped carpet to that of a cut pile carpet nature, wherein there are no continuous pile fibers. Eliminating continuous pile fibers allows for removal of the pile from the primary backing using the same means for looped carpet as for cut pile carpet, so that both types of carpet may be processed uniformly. The cutting device will be retractable [FIG. 3B], for processing of cut pile carpet.

Debonding Binder System

Figure 6:
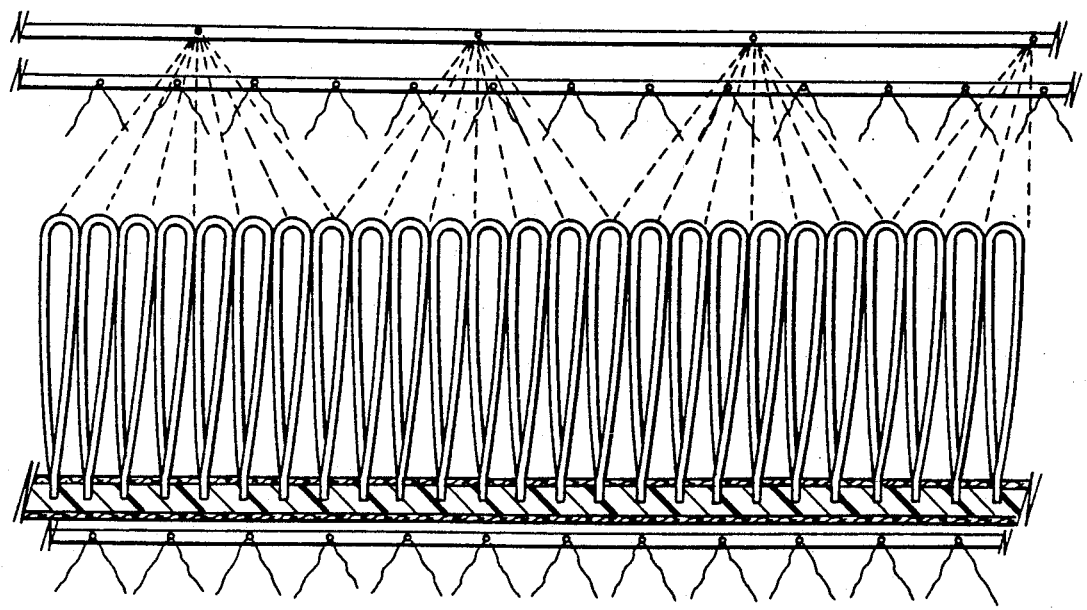
FIG. 6 illustrates the application of pressurized, heat-controlled fluids, acting upon the carpet from both the top and the underside of the carpet.
Figure 16A:
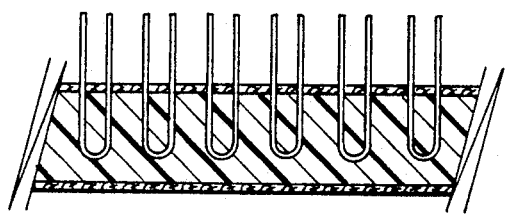
FIGS. 16A through 16C show three standard types of carpets available: standard carpet with cut or uncut pile within a matrix of primary and secondary backing [16A]; standard carpet with foam as the secondary backing [16B]; and standard carpet with a heavy rubber backing as the secondary backing (e.g., carpet tile) [16C].
Figure 16B:
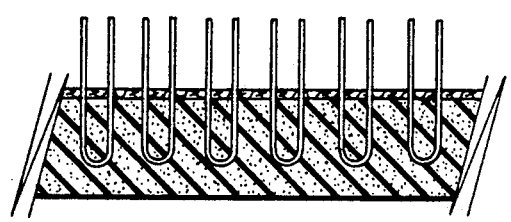
Figure 16C:
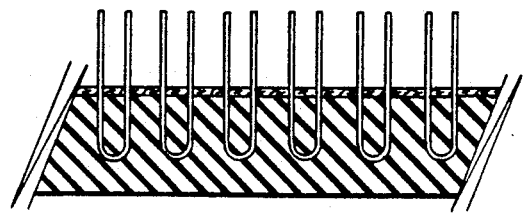

After the carpet passes the cutting station [FIG. 1E & 14E] and the second rejection port (recycle path) [FIG. 1F, 14F], the carpet then proceeds through a station [FIGS. 1G, 14G] wherein the carpet is acted upon by fluids under pressure, delivered through ports [FIG. 6], for the purpose of loosening and debonding the latex/filler binder system of the carpet from the secondary backing. Ports will be equipped to deliver, from one or both sides of the carpet, air, water, steam and chemical solutions, under variable temperature, thermal and directional control systems. The choice and combination of fluid, pressure, temperature and direction will depend upon the nature of the latex/filler binder system (e.g., standard carpet with primary and secondary backing [FIG. 16A], with foam secondary backing [FIG. 16B], and with heavy rubber secondary backing [FIG. 16C], and the combination best suited for the particular binder system being loosened and debonded. Also, surfactants, as one type of chemical, could be utilized to lower the surface tension of the water to allow thorough wetting of the (latex/filler binder)/(pile, backing) interfaces. This will facilitate the removal of the binder system in later sections of the process. For the sake of simplicity, one station for such ports [FIGS. 1G & 14G] is presented in this embodiment, but the same system of ports may be applied at other stages of the process to further loosen and debond the backing system.

Removing Secondary Backing

Figure 4:
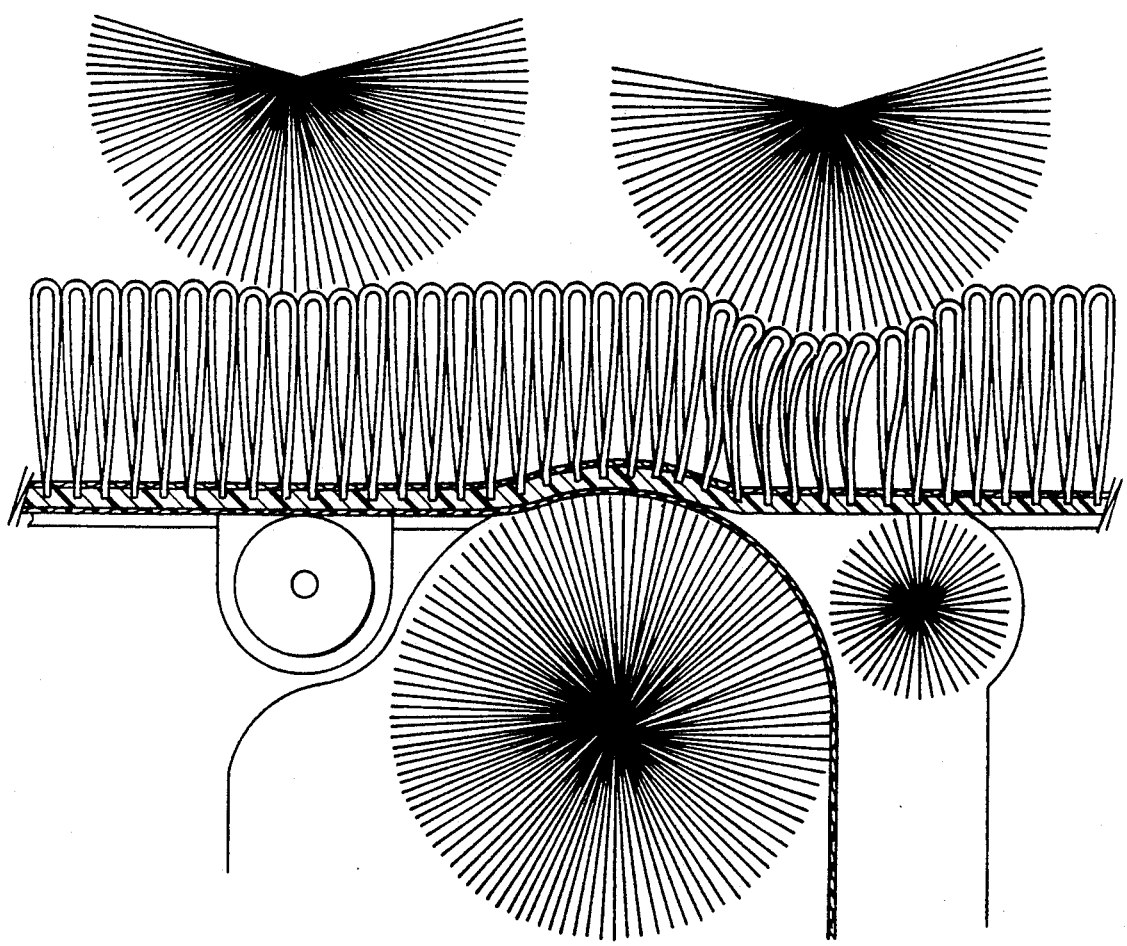
FIG. 4 illustrates the mechanism as cited in FIGS. 1H and 14H, wherein a series of rotating brushes or mechanical impingement devices, with the help of pressurized, heat-controlled fluids, remove the secondary backing, as cited in FIG. 1G and 14G, and further detailed in FIG. 6, from the underside of the carpet.

After the carpet has passed the initial stage for loosening and debonding the latex/filler binder system [FIGS. 1G, 14G], the carpet enters the secondary backing removal stage, which presents a means for separating and removing the secondary backing from the carpet matrix, wherein the secondary backing is acted upon by a series of mechanical impingement devices or showers and nipping devices from both sides of the carpet [FIG. 4], whereby, the leading edge of the secondary backing (now partially debonded from the bottom side of the later/filler binder/pile configuration) is driven to the nip zone and stripped from the carpet matrix [FIGS. 1H, 14H]. The remaining carpet matrix (pile/primary backing/latex clay binder) then proceeds past another diversion port (recycle path), as previously described [FIG. 1I, 14I].

Removing Binder System

Figure 5A:
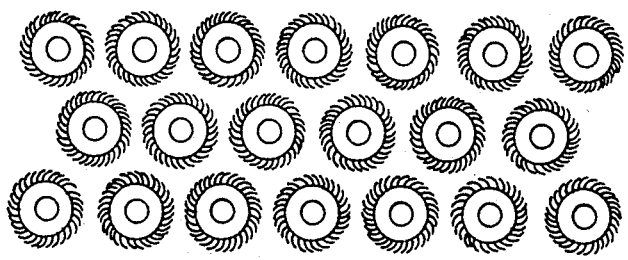
FIG. 5A and 5B illustrate the mechanism in detail, as cited in FIGS. 1J and 14J, wherein a bank of horizontally rotating brushes, with the help of pressurized, heat-controlled fluids, remove the latex/filler binder system from the interface of the pile and the primary backing.
Figure 5B:
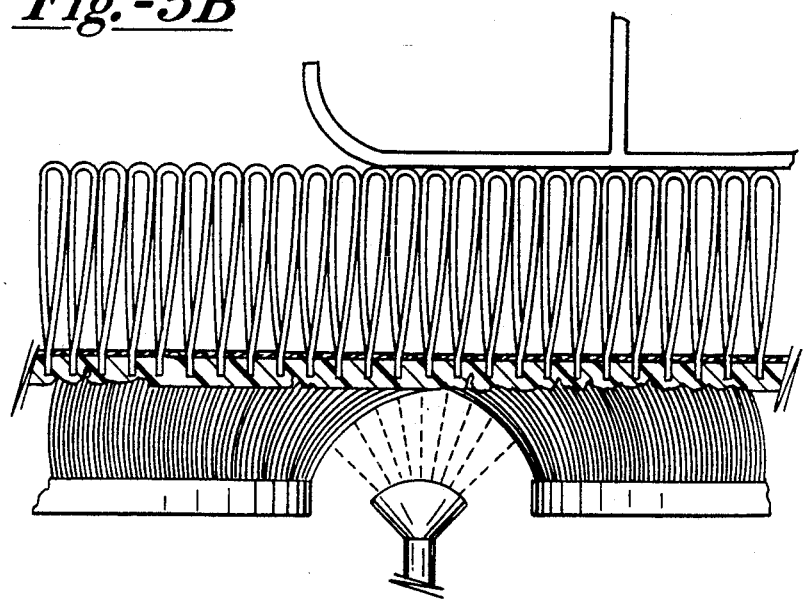
Figure 7A:
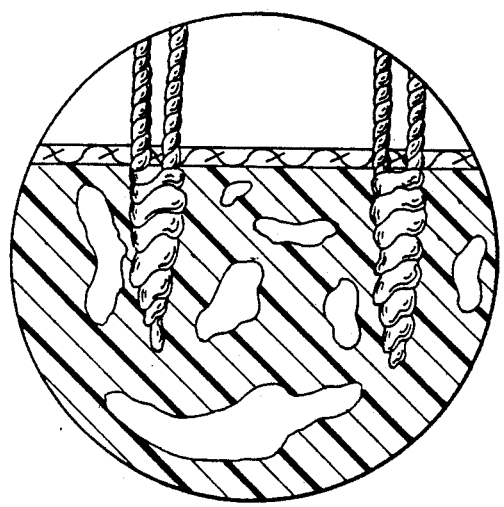
FIGS. 7A through 7C illustrate the stepwise removal of the latex/filler binder system, as cited in FIG. 5B.
Figure 7B:
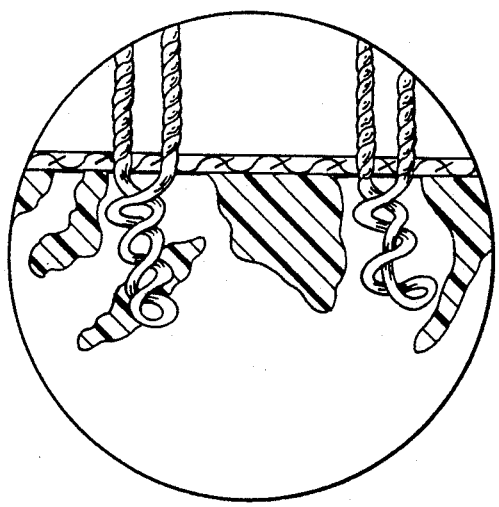
Figure 7C:
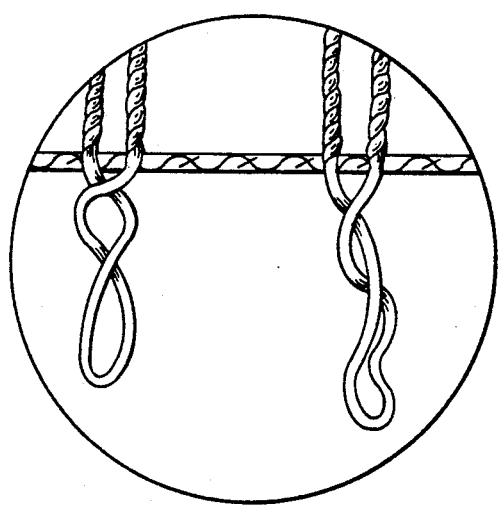
Figure 12A:
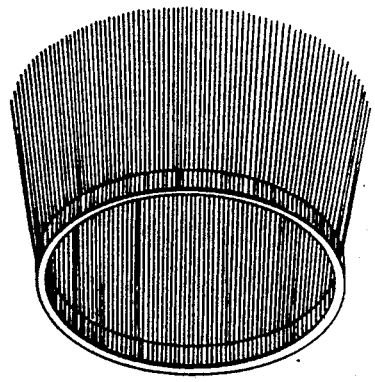
FIGS. 12A and 12B illustrate methods of latex removal.
Figure 12B:
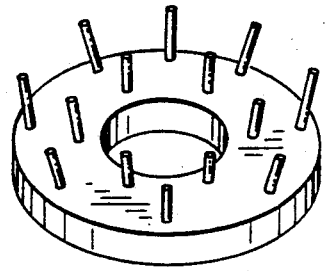
Figure 13A:
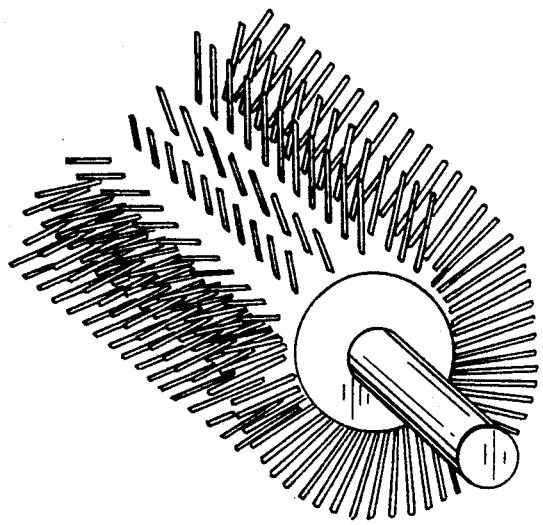
Figure 13B:
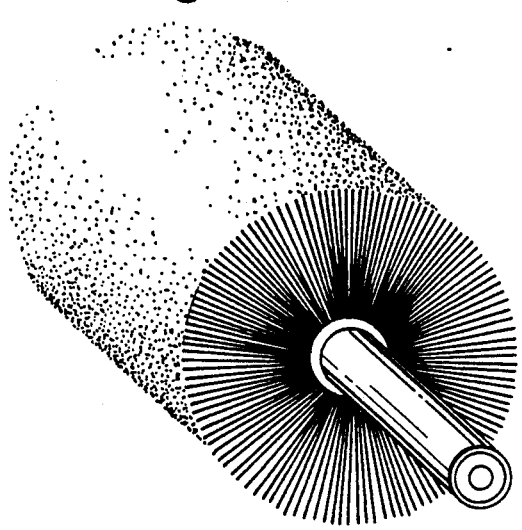
Figure 13C:
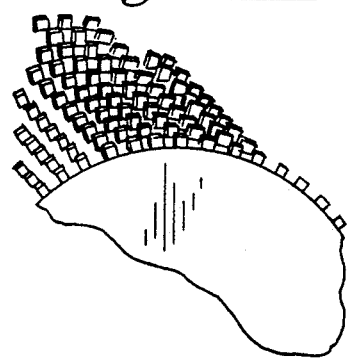
Figure 13D:
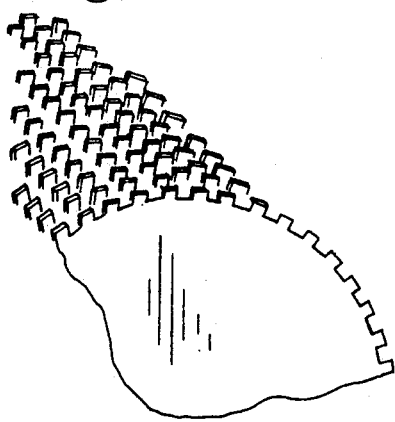
Figure 13D:
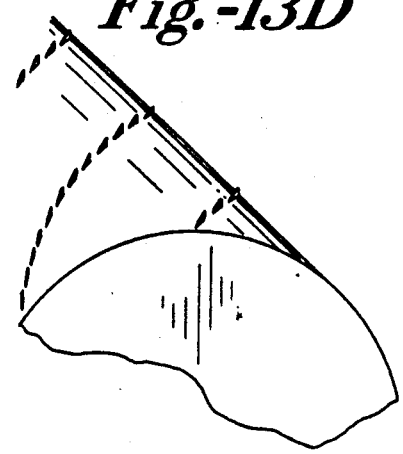

The carpet next enters a station presenting a means for loosening, separating and removing the latex/filler binder system from the primary backing and pile matrix [FIGS. 1J, 14J], wherein the carpet matrix and particularly the latex/filler binder system is acted upon by mechanical and/or hydraulic impingement elements [FIG. 5A], rotating in a plane parallel to the carpet [FIG. 5B], in this embodiment shown with the preferred used of cup brushes [FIG. 12A] and rotating high pressure nozzle heads [FIG. 12B]. These elements may rotate clockwise and/or counterclockwise and/or in any combination, to gradually loosen and remove the latex/filler binder system from the pile/primary backing interface [FIGS. 5B, 7A-7C] in such a way as to not dislodge the pile from the primary backing. The degree to which the special relationship of the pile/primary backing matrix is undisturbed is governed by the speed and pressure applied to the rotating elements. The further application of pressurized fluids through ports, under temperature, pressure and directional controls, may be further utilized before, during and after the carpet enters this stage, as previously described and shown [FIGS. 1G, 6, 14G], in order to further loosen and flush the latex/filler binder from the pile/primary backing interface. The number of elements at this stage, their speed, the pressure, temperature and direction of the fluids used, and the speed of the carpet are to be adjusted so that as the pile/primary backing leaves this stage, the latex/fill binder has been removed, leaving the pile/primary backing intact, with the pile loops suspended beneath the primary backing [FIG. 7C]. After leaving this stage, the carpet again passes through a diversion port (recycle path), as previously described [FIGS. 1K, 14K].

Removing the Pile

Figure 8A:
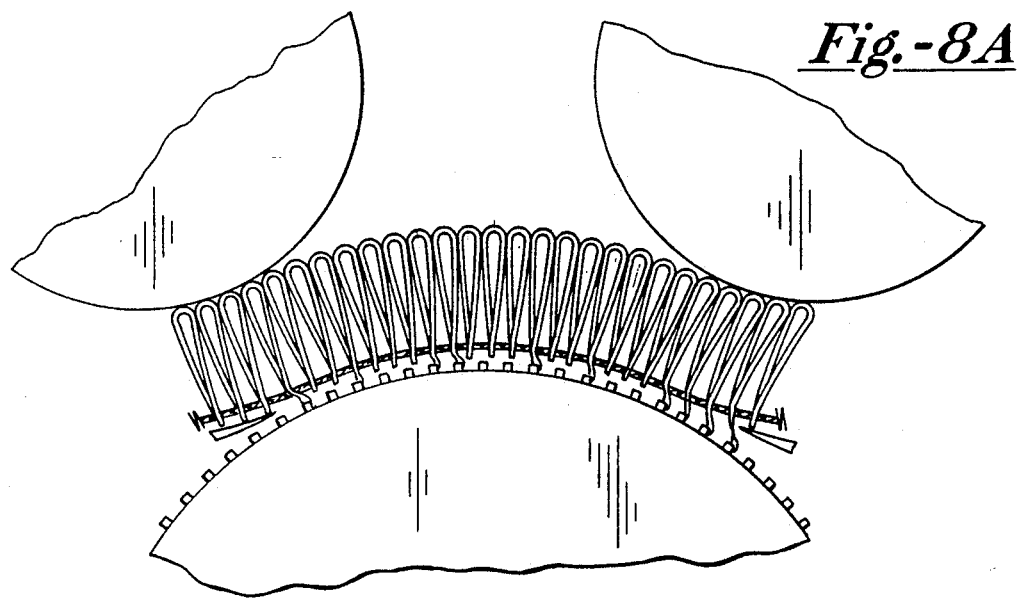
FIGS. 8A through 8E illustrate the vertically rotating mechanical impingement devices that remove the pile from the primary backing.
Figure 8B:
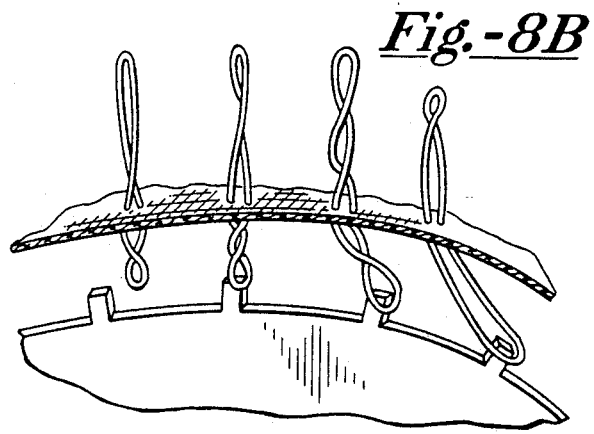
Figure 8D:
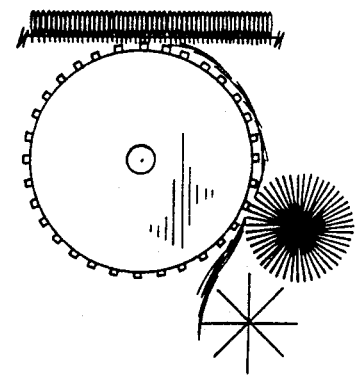
Figure 8C:
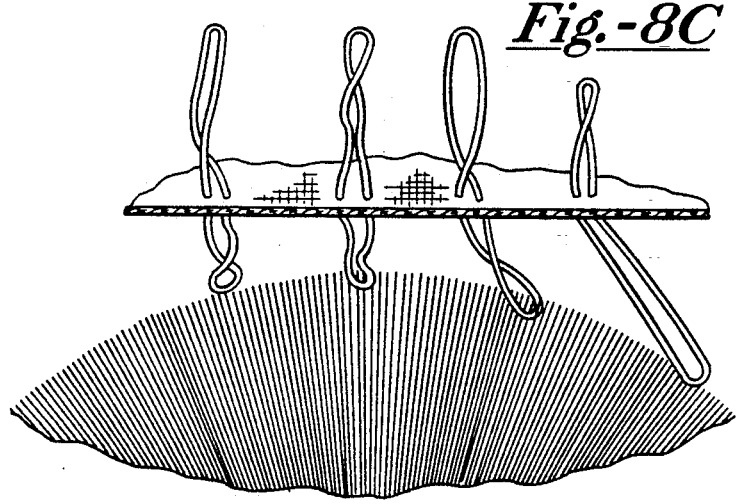
Figure 8E:
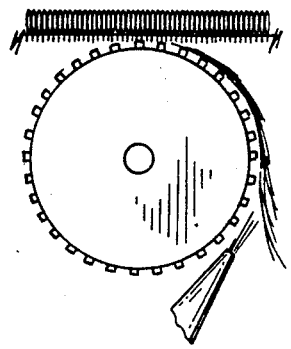
Figure 11A:
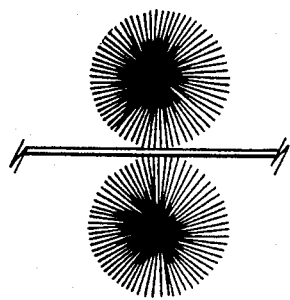
FIGS. 11A through 11E illustrate the variations of the drive system used to mechanically transfer or induce movement of the carpet through the apparatus.
Figure 11B:
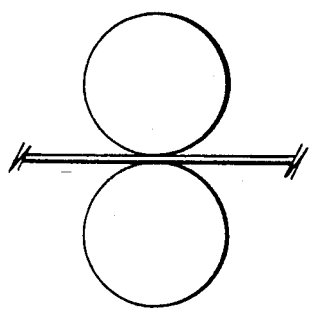
Figure 11C:
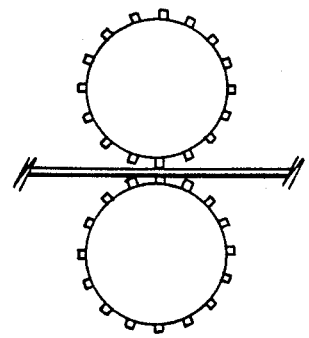
Figure 11D:
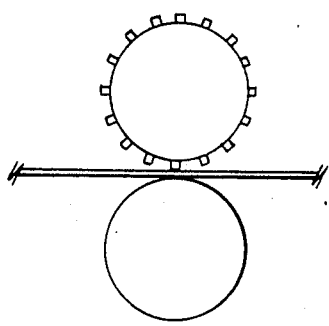
Figure 11E:
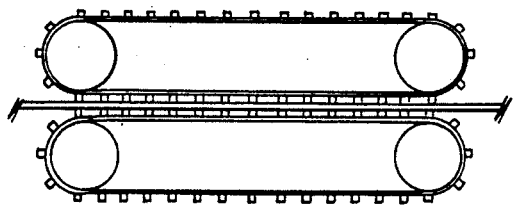
Figure 15:
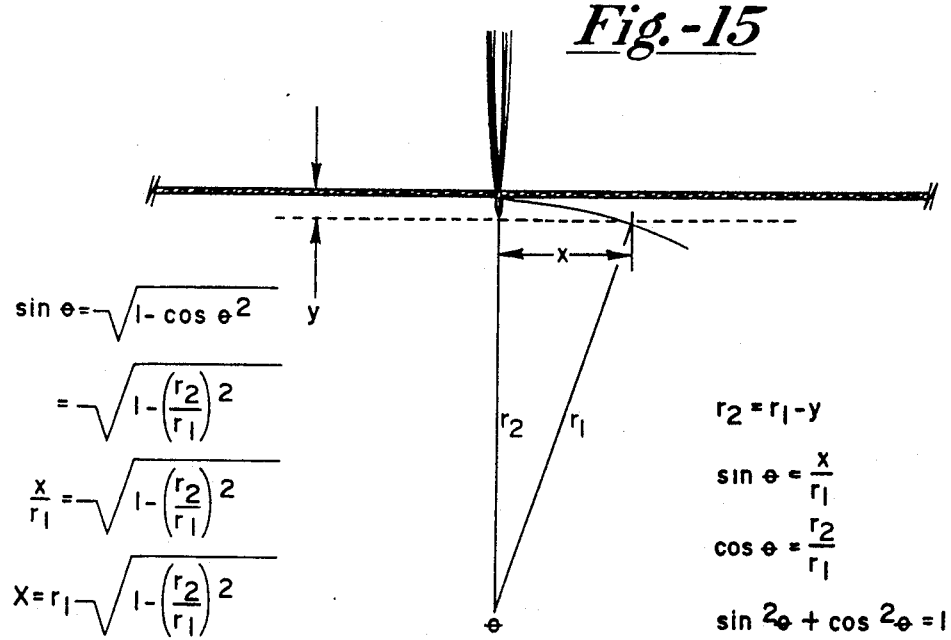
FIG. 15 illustrates an energy analysis of how to maximize energy transfer to pile from either a single rotating element or many small rotating elements (e.g., brushes), answering the question, which is better, a few large brushes or many small brushes occupying the same area.

The carpet matrix, now consisting of pile and primary backing, then enters a station presenting a means for removing the carpet pile from the primary backing [FIGS. 1L, 14L], wherein rotating mechanical impingement elements (preferably rotating in a plane not parallel to the matrix) impart momentum to the pile element suspended below the primary backing [FIG. 15, wherein the pile element suspended below the primary backing is shown by y, the radius of the impingement device is shown by r, and the maximum window of opportunity is the time its takes to move one impingement device a distance of 2×.] In application, multiple impingement devices rotating at a high speed offer the greatest opportunity to draw pile elements from the primary backing [FIG. 8A-8C], and deposit the pile in the path for transportation to the collection container. Further, it is preferred that the impingement devices be of the nature as shown in FIG. 13A-13E. Further, the rotating element [e.g., FIG. 12] is subjected to a cleaning device [FIGS. 8D, 8E)] wherein the pile is removed from the rotating element by a fixed or rotating comb with or without the aid of an air shower from the pile element removal device.

The primary backing (now devoid of any pile elements) next passes through another diversion port (recycle path), as previously described [FIGS. 1M, 14M], and then proceeds to another stage [FIGS. 1N, 14N], wherein the primary backing is directed to a collection device [FIG. 9].

In the preferred embodiment, all drive sections of each stage [FIGS. 11A-11E] in the process will be controlled in an interdependent fashion, to afford both automatic and manual control of each section of the process, and of each ancillary support element and device as previously described, so that the carpet debonding and separation process is a smooth, continuous operation. Further, the process will incorporate a series of mechanical and electrical ancillary support elements (e.g., high pressure air system, chemical feed system, high pressure steam and condensate recovery system, lubrication system, electrical system, control system, gas system, and vacuum system), as well as a series of mechanical and pneumatical material transport devices to remove the individual reclamation streams (e.g., polyethylene or polypropylene in the primary and secondary backing or nylon in the pile and filled SBR latex in the binder) for subsequent cleaning and processing.

We claim:

1. A method for disintegrating, separating and segregating the base component materials of carpet, which comprises:
   providing a carpet constructed of several components including a carpet pile, a primary backing, a secondary backing, a pile matrix, a carpet matrix, and a latex/filler binder system that bonds the pile and the backings and matrix to one another;
   (a) loosening and debonding the latex/filler binder system from the secondary backing; followed by
   (b) separating and removing the secondary backing from the carpet matrix; followed by
   (c) loosening, separating and removing the latex/filler binder system from the primary backing and pile matrix; followed by
   (d) removing the carpet pile from the primary backing; and
   (e) as each base component material is removed from the carpet matrix, transporting that material in a segregated stream to a container for that material.

2. A method according to claim 1 which further comprises positioning carpet in line for initial processing through said apparatus.

3. A method according to claim 2, which further comprises incorporating rotating elements forming a table, said elements positioned to advance the carpet in a diagonal direction, moving the carpet to one side of said table, positioning the carpet for entry to the next stage of the disintegration, separation and segregation process.

4. A method according to claim 1, which further comprises segmenting continuous yarn carpet when present.

5. A method according to claim 4, which further comprises incorporating a plurality of rotating cutting edges, positioned to act upon continuous loop carpet, shearing the continuous loop into interrupted strands of pile fiber.

6. A method according to claim 1, which further comprises diverting, at each stage of the separation and segregation process, carpet deemed inappropriate for further processing.

7. A method according to claim 6, which further comprises incorporating retractable ports for diverting inappropriate carpet.

8. A method according to claim 1, wherein loosening and debonding the latex/filler binder from the secondary backing further comprises delivering fluids under pressure to the carpet via a plurality of ports.

9. A method according to claim 1, wherein loosening and debonding the latex/filler binder from the secondary backing further comprises delivering fluids under pressure to the carpet via a plurality of ports, and selecting said fluids from the group consisting of air, water, heated air, steam, and chemical solutions.

10. A method according to claim 9, wherein loosening and debonding the latex/filler binder from the secondary backing further comprises incorporating a plurality of rotating impingement devices acting upon the carpet.

11. A method according to claim 1, wherein loosening and debonding the latex/filler binder from the secondary backing further comprises incorporating a plurality of rotating impingement devices acting upon the carpet.

12. A method according to claim 1, wherein separating and removing the secondary backing from the carpet matrix further comprises incorporating a plurality of rotating impingement devices acting upon the carpet.

13. A method according to claim 1, wherein loosening, separating and removing the latex/filler binder from the primary backing and pile matrix further comprises incorporating a plurality of rotating impingement elements acting upon the carpet in a parallel plane.

14. A method according to claim 1, wherein loosening, separating and removing the latex/filler binder from the primary backing and pile matrix further comprises delivering fluids under pressure to the carpet via the ports, selecting said fluids from the group consisting of air, water, heated air, steam, and chemical solutions.

15. A method according to claim 1, wherein loosening, separating and removing the latex/filler binder from the primary backing and pile matrix further comprises incorporating a plurality of ports, and delivering fluids under pressure to the carpet via the ports, selecting said fluids from the group consisting of air, water, heated air, steam, and chemical solutions.

16. A method according to claim 1, wherein extracting and removing the pile from the primary backing further comprises incorporating rotating impingement elements acting upon the carpet to remove the carpet pile from the primary backing.

17. A process for separating a carpet into its base component materials, comprising the steps of:
providing a carpet constructed of several components including a carpet pile, a primary backing, a secondary backing, and a binder that bonds the pile and the backings to one another;
loosening and debonding the binder, at least from the secondary backing;
separating and removing the secondary backing from a remainder of the carpet, said remainder including at least the carpet pile and the primary backing; and
removing the carpet pile from the primary backing.

18. The process of claim 17 wherein the step of loosening and debonding the binder includes:
loosening and debonding the binder from the secondary backing, before the step of separating and removing the secondary backing; and
loosening, separating and removing the binder from the primary backing and the pile, after separating and removing the secondary backing and before removing the carpet pile from the primary backing.

19. The process of claim 18, including the further step of:
after removing each of the components, transporting each component in a segregated stream consisting substantially of that component, to a container for that component.

20. The process of claim 17 wherein the carpet pile is formed as at least one continuous loop, said process including the further step of:
cutting the at least one continuous loop into multiple interrupted strands of pile fiber, before removing the carpet pile from the primary backing.

21. The process of claim 20 wherein:
the step of cutting the at least one continuous loop is performed before separating and removing the secondary backing.

22. An apparatus for disintegrating, separating and segregating a carpet comprised of several base component materials including a pile, a primary backing, a secondary backing, and a binder that bonds the pile and backings to one another, said apparatus comprising:
(a) a debonding means for receiving a carpet and for loosening and debonding a binder of the carpet from the secondary backing of the carpet;
(b) a separating means for separating and removing the secondary backing from a carpet matrix including a primary backing of the carpet and a pile of the carpet;
(c) a binder removal means for loosening, separating and removing the binder from the carpet matrix; and
(d) a pile removal means for removing the carpet pile from the primary backing of the carpet matrix.

23. An apparatus according to claim 22, further comprising means for positioning the carpet in line for processing by said debonding means, separating means, binder removal means and pile removal means.

24. An apparatus according to claim 23, further comprising rotating elements forming a table, said elements positioned to advance the carpet in a diagonal direction, moving the carpet to one side of said table, positioning the carpet for treatment by one of the debonding means, separating means, binder removal means and pile removal means.

25. An apparatus according to claim 22, further comprising a segmenting means for segmenting the pile, said pile being of continuous and looped form before said segmenting.

26. An apparatus according to claim 25, wherein the segmenting means comprises a plurality of rotating cutting edges, positioned to act upon the pile shearing a continuous loop of the pile into interrupted strands of pile fiber.

27. An apparatus according to claim 22, wherein the debonding means, separating means, binder removal means and pile removal means are arranged in successive stages, said apparatus further comprising a means for diverting, at each stage corresponding to one of the separating means and pile removal means, carpet deemed inappropriate for further processing.

28. An apparatus according to claim 27 further comprising retractable ports for diversion of carpet deemed inappropriate for further processing.

29. An apparatus according to claim 22, wherein said debonding means comprises a plurality of ports, and fluid delivered under pressure through the ports to the carpet.

30. An apparatus according to claim 22, wherein said debonding means comprises a plurality of ports, and fluids under pressure delivered to the carpet via the ports, said fluids selected from the group consisting of air, water, heated air, steam, and chemical solutions.

31. An apparatus according to claim 27, wherein said debonding means further comprises a plurality of rotating impingement devices acting upon the carpet.

32. An apparatus according to claim 22, wherein said debonding means comprises a plurality of rotating impingement devices acting upon the carpet.

33. An apparatus according to claim 22, wherein said separating means comprises a plurality of rotating impingement devices acting upon the carpet.

34. An apparatus according to claim 22, wherein said binder removal means comprises a plurality of rotating impingement elements acting upon the carpet in a parallel plane.

35. An apparatus according to claim 34, wherein said binder removal means comprises a plurality of ports, and fluids under pressure delivered to the carpet via the ports, said fluids selected from the group consisting of air, water, heated air, steam, and chemical solutions.

36. An apparatus according to claim 22, wherein said binder removal means comprises a plurality of ports, and fluids under pressure delivered to the carpet via the ports, said fluids selected from the group consisting of air, water, heated air, steam, and chemical solutions.

37. An apparatus according to claim 22, wherein said pile removal means comprises rotating impingement elements acting upon the carpet whereby the pile is removed from the primary backing.

38. An apparatus according to claim 22, further comprising means for transporting each of said base component materials in a segregated stream consisting substantially of that material to a container for that material, after that material is removed from a remainder of the carpet.

* * * * *